United States Patent [19]

Rutter

[11] 4,062,122

[45] Dec. 13, 1977

[54] FIXTURE FOR SETTING THE STATIONARY GAGING CONTACT ON A DIAL BORE GAGE

[75] Inventor: Harold T. Rutter, Kirkwood, Mo.

[73] Assignee: Sunnen Products Company, St. Louis, Mo.

[21] Appl. No.: 759,843

[22] Filed: Jan. 17, 1977

[51] Int. Cl.² .............................................. G01B 5/00
[52] U.S. Cl. ............................... 33/169 R; 33/180 R; 33/178 R; 33/185 R
[58] Field of Search ............. 33/169 B, 169 R, 178 R, 33/164 C, 164 R, 163, 170, 180 R, 185 R, 165

[56] References Cited

U.S. PATENT DOCUMENTS

| | | | |
|---|---|---|---|
| 2,520,022 | 8/1950 | Vobeda | 33/170 |
| 2,886,895 | 5/1959 | Kushion | 33/185 R |
| 3,422,540 | 1/1969 | Worthen | 33/143 R |

*Primary Examiner*—Harry N. Haroian
*Attorney, Agent, or Firm*—Charles B. Haverstock

[57] ABSTRACT

A gaging fixture for presetting the radially extended position of a stationary work engaging contact on a dial bore gage or like instrument, wherein the stationary work engaging contact is mounted on a member threadedly engaged with the gage, which member carries a threaded locking member for locking the threaded member and the stationary work engaging contact thereon in predetermined and determinable positions of adjustment, said fixture including a first member having a portion for engaging the member on which the stationary work gaging contact is located, and a second member movable axially and rotatably relative to the first member and having a portion thereof engageable with the member for locking the stationary work engaging contact in predetermined radial positions, the portions of the said first and second members being constructed and positioned to simultaneously engage the member on which the stationary work engaging contact is located and the locking member associated therewith in only one predetermined relative position, and cooperating indicator means on said relatively movable members calibrated to indicate the radially extended position of the stationary work engaging contact for any setting of the fixture over a predetermined range of movement of the threaded member on which the stationary work engaging contact is located.

12 Claims, 14 Drawing Figures

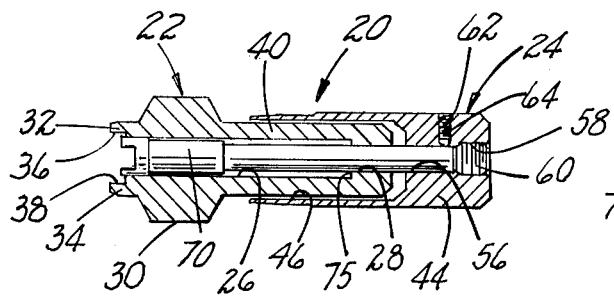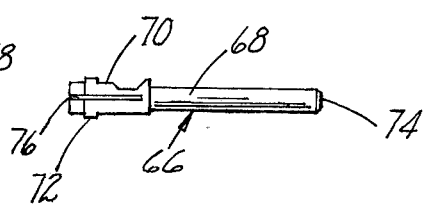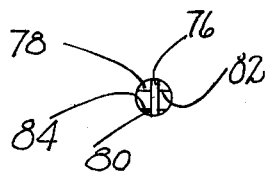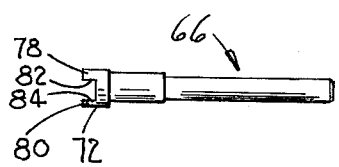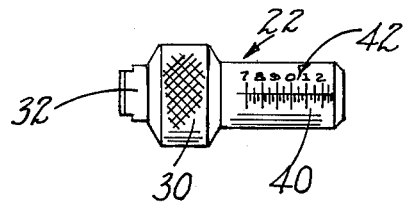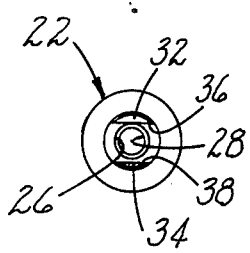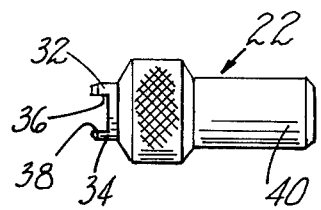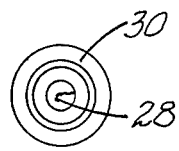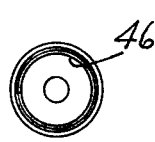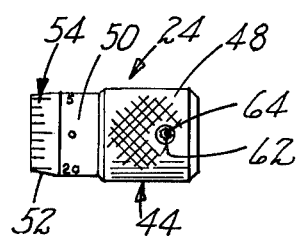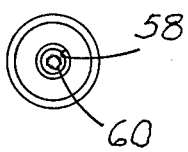

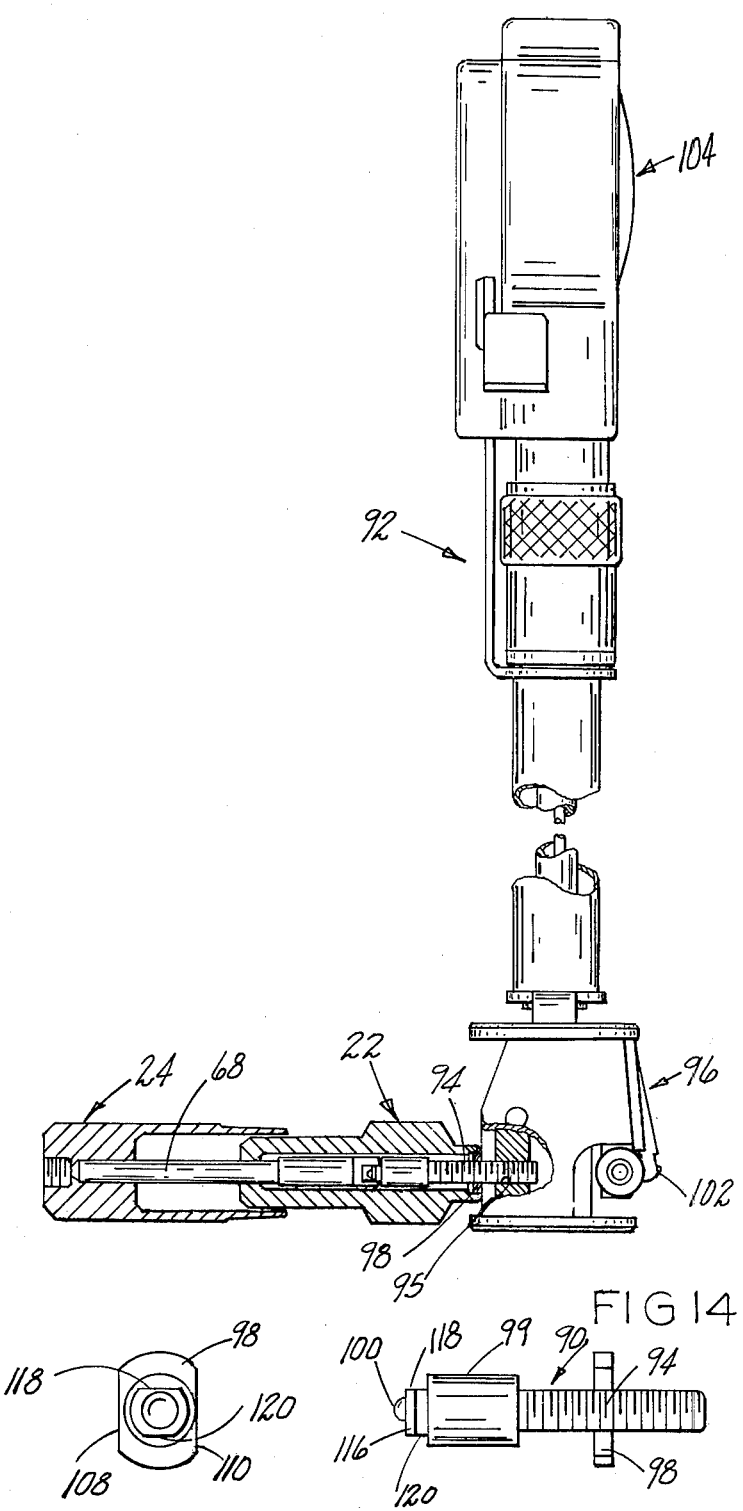

FIXTURE FOR SETTING THE STATIONARY GAGING CONTACT ON A DIAL BORE GAGE

Dial bore gages and like instruments for measuring the size and surface characteristics of bores are well known devices, have wide application and are used for many purposes. Typical of such dial bore gages is the dial bore gage disclosed in Rutter U.S. patent application Ser. No. 655,892, filed Mar. 11, 1976 and assigned to Applicant's assignee. As indicated in this copending case, it is well known to adjust or select a diameter or range of measurements that can be measured by a particular dial bore gage, and when this is done a particular gage can be used to accurately gage and measure many different diameters simply by setting the radially extended position of the stationary work engaging contact. Heretofore the usual way for adjusting the position of the stationary or non-movable contact has been to mount the contact on a member that is threaded into the work engaging end of the gage, and this contact is then threaded inwardly and outwardly to a desired position and locked in position by means of a locknut. It is important to be able to position the stationary work engaging contact at a particular location taking into account the diameter of surface on workpiece to be measured. Being able to locate and hold a desired setting while tightening the locknut is difficult and imprecise when using known members and the like and when this is done some means are also still required to indicate when the desired setting is obtained. To accomplish this using known means requires trial and error setting techniques since merely tightening up on a locknut will usually produce some error unless means are provided to hold the setting while the locknut is tightened. The accuracy of such a setting procedure using known setting means depends on the skill and experience of the person making the setting and on the precision of the parts involved. The obvious limitations and shortcomings of such procedures are easily recognized, and as a result it has been difficult if not impossible using the known means to quickly and accurately preset the stationary work engaging contact so that the gage can then be accurately set and used to measure or indicate a particular diameter. It is especially difficult to accomplish the aforesaid accurately while the gaging contacts are engaged with a ring gage or other standard. For these and other reasons, the ability to accurately preset dial bore gages and like instruments has been limited, and it has not been possible or practical to set such gages precisely enough so that the gage can then be acurately set within a range for each different dimension to be measured. The present invention overcomes these and other limitations and shortcomings of known gage setting devices, and teaches the construction and operation of a setting fixture which is relatively simple structurally and operationally, and one which can be used as a coarse setting device to quickly preset a gage to any setting within the range thereof.

It is therefore a principal object of the present invention to teach the construction and operation of a novel setting fixture for use in setting the radial position of a work engaging contact such as the stationary work engaging contact of a dial gage or like instrument.

Another object is to provide a relatively simple inexpensive tool which can be operated even by persons having relatively little skill and training.

Another object is to increase the range of dimensions that can be accurately indicated using a dial bore gage.

Another object is to enable fairly accurate coarse presetting of a work engaging contact on a gage or like device to any position within the range of the adjustment means.

Another object is to facilitate adjustment of a threaded member while retaining a locking member therefor in an unlocked position.

Another object is to enable a dial bore gage or like instrument to be coarsely preset so that it can thereafter be accurately set to a desired dimension using ring gages or other dimensional standards to achieve the desired gaging accuracy.

Another object is to enlarge the range of accurate setting positions of dial bore gages.

These and other objects and advantages of the present invention will become apparent after considering the following detailed specification which discloses a preferred embodiment of the present device in conjunction with the accompanying drawings, wherein:

FIG. 1 is a side elevational view in cross section taken on the axis of a setting fixture constructed according to the present invention;

FIG. 2 is a side elevational view of one of the relatively movable portions of the fixture of FIG. 1;

FIG. 3 is a top view of the fixture portion shown in FIG. 2;

FIG. 4 is a left end view of the fixture portion of FIG. 3;

FIG. 5 is a right end view of the fixture portion of FIG. 3;

FIG 6 is a side elevational view of another portion of the setting fixture of FIG. 1;

FIG. 7 is a left end view of the fixture portion of FIG. 6;

FIG. 8 is a right end view of the fixture portion of FIG. 6;

FIG. 9 is a side elevational view of a member attached to the fixture portion shown in FIGS. 6–8;

FIG. 10 is a top view of the member shown in FIG. 9;

FIG. 11 is a left end view of the member shown in FIG. 10;

FIG. 12 is a side view of an adjustable stationary gaging point assembly for use on a dial bore gage;

FIG. 13 is a left end view of the assembly shown in FIG. 12; and,

FIG. 14 is a side elevational view of a dial bore gage equipped with an adjustable stationary gaging contact assembly similar to that shown in FIGS. 12 and 13, said view also showing in cross-section a setting fixture operatively engaged with said assembly.

Referring to the drawings more particularly by reference numbers, number 20 identifies a setting fixture constructed according to the present invention. The setting fixture 20 includes first and second relatively movable portions 22 and 24. As shown in FIG. 1, the portion 22 is an elongated cylindrical member having a bore 26 which extends into it from one end and communicates with a smaller diameter bore portion 28 adjacent the opposite end. The member 22 also has an enlarged diameter portion 30 which is knurled on its outer surface for ease of gripping, and the end of the member 22 has two spaced endwardly projecting portions 32 and 34 which have respective opposed surfaces 36 and 38 formed thereon. The surfaces 36 and 38 are parallel to each other and are located different distances from the axis of the member 22, the portion 32 being shown somewhat thicker in the radial direction than the portion 34 (see FIG. 4). As shown in FIG. 2 the member 22 has a cylindrical body portion 40, and a scale 42 is formed on the outer surface thereof and extends in an axial direction.

The member 24 is likewise cylindrical in shape and has a body portion 44 (FIGS. 1 and 6) which has a counterbore 46 extending into it from one end. The counterbore 46 is slightly larger in diameter than the cylindrical body portion 40 of the member 22 and receives the body portion 40 therein as clearly shown. The body portion 44 has an enlarged diameter portion 48 which is knurled on its outer surface, and the portion 44 has a reduced diamer portion 50 which extends from one end of the knurled portion 48 and has its opposite end connected to a tapered end portion 52. A circumferential scale 54 is formed on the tapered end portion 52, and the scale 54 cooperates with the axial scale 42 on the member 22 during operation of the device. The member 24 has a smaller diameter bore 56 which extends from one end of the counterbore 46 to a threaded bore portion 58 which extends therefrom to the opposite end of the member 24 from the tapered portion 52. The threaded bore 58 receives a threaded locking member or plug 60 (FIGS. 1 and 8) which is adjusted at the factory to accurately locate a member such as member 66 to be described later in the member 24. The member 24 also has a radially extending threaded bore 62 which extends from the outer surface thereof to the bore 56. The bore 62 receives a locking member or set screw 64 which is used to lock the member 66 in position in the bore 56.

The member 66 is rod shaped (FIGS. 9-11) and has a cylindrical rod portion 68 of the same diameter as the diameter of the bore 56. The member 66 also has an end portion 70 which is somewhat larger in diameter than the rod portion 68 and includes a round portion 72 of approximately the same diameter as the bore 26 in the member 22. The rod member 66 is positioned extending through the member 22 (FIG. 1) with the rod portion 68 extending into the bore 56. The accurate location of the rod portion 68 in the bore 56 is important for reasons which will become apparent later, and this position is locked against movement by means of the set screw 64 in the radial bore 62. In this position, the threaded member or plug 60 abuts the end surface 74 of the member 66 and this provides means to accurately locate the member 66 therein during assembly. Adjustment of the member 60 is preferably done at the factory and normally will not be changed in the field. Preventing field adjustment can be assured by providing means to lock the member 60 in the bore 58. With the members assembled and connected as disclosed in FIG. 1, the member 22 can move axially and rotationally relative to the member 24, being limited in these movements only by engagement between the enlarged end portion 70 on the member 66 and shoulder 75 formed at the juncture between the bores 26 and 28. This engagement prevents complete separation of the portions 22 and 24.

Referring again to FIGS. 9-11, the enlarged end portion 70 of the member 66 is shown bifurcated by a slot 76 which extends inwardly from the free end thereof. The enlarged end portion 72 of the member 66 is formed by the spaced endwardly extending portions 78 and 80 which are of different radial thickness, and the members 78 and 80 have respective surfaces 82 and 84 thereon which are in spaced parallel relation. With the radial thicknesses of the portions 78 and 80 being different, it means that the space formed therebetween is offset somewhat relative to the axis of the device and this is clearly evident in FIGS. 10 and 11. The reasons for this off axis condition is so that the portions 78 and 80 can only move into engagement with a member to be turned thereby in one position, and this is important to the operation of the device. The same is also true of the spaced portions 32 and 34 on the member 22. The particular manner in which the portions 32 and 34 and the portions 78 and 80 engage threaded members on the dial bore gage during adjustment is important to the operational accuracy of the subject fixture because it makes the scales 42 and 54 cooperate in such a way as to give a fairly accurate direct reading of the radial position to which the stationary work engaging contact is adjusted as will be described more in detail in connection with FIGS. 12-14.

In FIG. 12 the details of a stationary but adjustable gaging contact assembly 90 for a dial bore gage 92 of the type shown in FIG. 14 is shown. The assembly 90 includes a threaded portion 94 which cooperates with a threaded bore 95 provided therefor in the gaging end portion 96 of the dial bore gage 92. A locking member 98 is mounted on the threaded portion 94 of the assembly 90, and when the assembly 90 is in a desired radial position on the gage 92, the member 98 is rotated to be against the gaging portion 96 to retain the setting. The assembly 90 has a head end portion 99 with a work engaging member 100 mounted on the free end thereof. The member 100 is one of two portions of the gage 92 which engage the work during a gaging operation. The other work engaging member is the movable work engaging member 102, and the member 102 engages the surface being gaged diametrically opposite from the member 100. The gage 92 may also have work engaging centralizer members which engage the work surface to make sure that the contacts 100 and 102 are on a diameter of the work during gaging, but the centralizers and other gage portions are not parts of the present invention as such. The movable work engaging contact 102 is operatively connected to dial portions 104 of the gage 92 in a manner known to the prior art.

The purpose of the subject fixture 20 is to provide means to fairly accurately preset the stationary work engaging assembly 90, and particularly the work engaging contact 100 thereon, so that the gage 92 with this coarse setting can be used to accurately gage any diameter of work surface within a close range of coarse adjustment obtained. It is recognized, however, that some standard or fine setting device may be required to achieve the final gaging accuracy desired. With the subject fixture it is possible to make the coarse adjustment easily and quickly without the awkwardness normally associated with making adjustments especially adjustments where one threaded member is used to lock the position of another. The head end portion 99 of the assembly 90 and the lock nut 98 are constructed to cooperate with the subject fixture during adjustment thereof as will be described.

Referring to FIG. 14, the threaded portion 94 of the assembly 90 is shown threaded into the threaded bore 95 provided therefor in the gaging portion 96. While in this position and using the subject setting fixture installed on the gage as shown, the locking member 98 is loosened on the threaded portion 94 by engagement thereof with means on the fixture so as to be out of engagement with gaging portion 96. It is now possible to turn the assembly 90 in either direction as required to reach a desired adjustment.

The locking member 98 as already stated is threadedly engaged with the threaded portion 94, and is constructed to have two parallel opposite surfaces 108 and 110 (FIG. 13). The surfaces 108 and 110 as clearly shown are parallel and are spaced different distances from the axis of the assembly 90. Furthermore, the distance between surfaces 108 and 110 is the same as the distance between the opposed parallel surfaces 36 and 38 on the respective portions 32 and 34 of the member 22. This is so that the surfaces 36 and 38 will engage the surfaces 108 and 110 in one position only as shown in FIG. 14. The fact that these surfaces are only engageable in one position is important because this is one of the conditions that is necessary for the scales 42 and 54 to cooperate and to give a direct reading of the gage setting.

The work engaging member 100 on the assembly 90 is mounted on an endward extension 116 of the assembly 90, and the portion 116 has opposite parallel surfaces 118 and 120 (FIGS. 12 and 13) which are likewise spaced different distances on opposite sides of the axis of the assembly 90 and in position to be engaged by the respective parallel surfaces 82 and 84 on the portions 78 and 80, of the member 66 (FIG. 10). This is so that the members 24 and 66 and the assembly 90 can become cooperatively engaged also in one position only as shown in FIG. 14. It is now apparent that both the locking member 98 and the assembly 90 can only be simultaneously engaged with the members 22 and 24 in one position. This is what makes it possible for the graduated scales 42 and 54 to cooperate and be calibrated to directly indicate the position of the work engaging member 100 in all positions of the assembly 90 on the gage 92. Because of this an operator can, by loosening the locknut 98, preset the position of the work engaging contact 100 and thereafter lock the gage in this condition. This can be done quickly and with little or no special skill or training.

When the setting fixture 20 is operatively engaged with the dial bore gage, it is a simple matter while holding onto the members 22 and 24 to first rotate the member 22 to loosen the locking member 98, and while holding the locking member in its loosened condition, rotate the member 24 and the engaged assembly 90 to achieve a desired setting position as indicated by the scales 42 and 54. When the member 24 is rotated in one direction, the assembly 90 will move inwardly reducing the effective gaging diameter, and when the member 24 is rotated in the opposite direction the assembly 90 will move outwardly increasing the gaging diameter. When the desired position for the member 24 has been reached as determined by the relative positions of the scales 42 and 54, the member 22 can be turned slightly while maintaining and moving the member 24 in concert therewith to retain the desired setting, and to bring the lock member 98 into locking position against the gage portion 96. This is easy to accomplish.

The scale 42 on the member 22 (FIG. 2) is shown divided into equal increments and subincrements, and the scale 54 is divided into equal increments extending around the surface thereof, positions for twenty-five equal increments being indicated in FIG. 6. The scale, as shown, is arranged so that one complete rotation of the member 22 relative to the member 24, taking into account the dimensional characteristics of the threads on the assembly 90, will change the radial position of the assembly 90 by an amount equal to the distance between two adjacent scale lines on the scale 42. Obviously other increment spacings and scales can also be used depending on the threads selected for use on the assembly 90.

The purpose of the slot 76 which extends in from the free end of the member 66 (FIG. 9) is to enable the enlarged end portion 70 thereof to have a somewhat larger unstressed diameter than the diameter of the bore 26 in which it moves. This is done so that there will be some friction between the members 66 and 22 which is desirable to prevent looseness and to improve the feel of the device.

A dial bore gage can be provided with any desired number of threaded assemblies such as the assembly 90, and each such assembly can have a different length to cover a different range of measurements. Each different length assembly can be adjusted within its portion of the scale 42 using the subject fixture. This means that the same fixture can be used to preset a plurality of different length assemblies 90 to cover the very wide range of possible gage diameters.

Thus there has been shown and described a novel setting fixture for locating and presetting the position of a threaded member, including a threaded member having a work engaging contact thereon, which setting fixture fulfills all of the objects and advantages sought therefor. It will be apparent to those skilled in the art, however, that many changes, modifications, variations and other uses and applications for the subject setting fixture are possible, and all such changes modifications, variations, and other uses and applications which do not depart from the spirit and scope of the invention are deemed to be covered by the invention which is limited only by the claims which follows.

What is claimed is:

1. A fixture for setting and locking a male threaded member in a predetermined extended position from a threaded opening in a structure, a locking member threadedly mounted on the male threaded member and movable thereon into locking engagement with the structure to lock the male threaded member in position thereon and prevent relative movement between the male threaded member and said structure, said setting fixture comprising first and second relatively movable members, said first relatively movable member having a bore therein and said second relatively movable member having a portion thereon which extends into said bore, cooperating means on said first and second relatively movable members engageable to permit relative axial and rotational movement therebetween, said second relatively movable member having means thereon for cooperatively engaging the locking member to enable rotation of the locking member between a locked position engaging the structure and an unlocked position out of engagement therewith, said first relatively movable member having means thereon for cooperatively engaging the male threaded member for movement in concert therewith during adjustment, said first and second relatively movable members being simultaneously engageable respectively with said male threaded member and with said locking member, and cooperating relatively movable indicating means on said first and second relatively movable members, said indicating means being calibrated to indicate the extended position of the male threaded member relative to the locking member for all relative positions of the first and second relatively movable members when said members are simultaneously respectively engaged with said male threaded member and with said locking member.

2. The fixture defined in claim 1 wherein the first and second relatively movable members are positioned in axial alignment relative to each other, said locking member and the means on the second relatively movable member engageable therewith being cooperatively engageable in one relative rotational position only of said members.

3. The fixture defined in claim 1 wherein the means on the first relative movable member cooperatively engageable with the male member include means cooperatively engageable therewith in one relative rotational position only of said members.

4. The fixture defined in claim 1 wherein the indicator means on one of said relatively movable members include a graduated scale axially located thereon, and a circumferentially extending graduated scale on the other relatively movable member for cooperating with said axially extending scale.

5. The fixture defined in claim 1 wherein said second relatively movable member has a bore therethrough, said first relatively movable member having a portion which extends into said bore, said portion having a bifurcated free end portion with an unstressed diameter slightly greater than the diameter of the bore in the second member whereby said bifurcated end portion makes frictional engagement with the bore during relative movement between said members.

6. The fixture defined in claim 1 wherein said first and second relatively movable members have enlarged body portions for ease of gripping and turning.

7. The fixture defined in claim 6 wherein the enlarged body portions on said first and second relatively movable members have knurled surface portions.

8. A fixture for setting a gaging contact mounted on a member threadedly engaged with a gaging device and including means to lock the threaded member in any predetermined position of adjustment on the gaging device within the range thereof, said threaded member and said locking means having respective surface portions thereon engageable for rotating same, said fixture comprising first and second relatively movable members, said first relatively movable member having means thereon engageable with the surface portion on said locking means and said second relatively movable member having means thereon for engaging the surface portion on said threaded member, the means for engaging on said first and on said second relatively movable members being positioned thereon to simultaneously engage the surface portions on the respective locking means and threaded member to establish a determinable relationship therebetween, cooperative graduated indicator means on the first and second relatively movable members calibrated to indicate said determinable relationship in terms of the extended position of the threaded member and of the gaging contact thereon relative to the gaging device for all positions of the threaded member thereon within the range of adjustment of the fixture.

9. The fixture defined in claim 8 wherein the first relatively movable member includes a cylindrical body having a pair of endwardly projecting portions on one end thereof engageable with the surface portion on the locking means and a bore therethrough, said second relatively movable member includes a cylindrical body with a bore therein of a size to receive the cylindrical body of the first relatively movable member, said second relatively movable member having a portion which extends into the bore in the first relatively movable member and has means thereon engageable with the surface portion on the threaded member.

10. The fixture defined in claim 9 wherein the surface portions on said locking means and on said threaded member include a respective pair of spaced parallel surfaces, the parallel surfaces on each member being located different distances on opposite sides of the axis of the threaded member to be adjusted.

11. The fixture defined in claim 8 wherein the indicator means on the first and second relatively movable members include an axially extending scale positioned on one of the members and a circumferentially oriented scale on the other.

12. A fixture for presetting the fixed gaging contact on a dial bore gage so that the bore gage can be used to gage surfaces of a predetermined diameter, the dial bore gage having a fixed but adjustable gaging contact mounted on a threaded member, a gage portion having a threaded bore for cooperatively receiving the threaded member therein, and a locking member threadedly positioned on the threaded member and movable thereon to a position against the gage portion to lock the threaded member and the gaging contact thereon in a predetermined position, said fixture comprising a pair of axially aligned relatively movable members one of which has means thereon engageable with the locking member and the other means thereon simultaneously engageable with the threaded member, means on said one member forming an axially extending scale, means on said other member forming a circumferentially extending scale, cooperation between the axial and circumferential scales indicating a setting for the gaging contact for each position of engagement of the relatively movable members when the means on said pair of relatively movable members are simultaneously engaged with the locking member and the threaded member.

* * * * *